No. 847,481.  
PATENTED MAR. 19, 1907.  
F. D. JOY.  
PADDLE WHEEL FOR BOATS.  
APPLICATION FILED MAY 31, 1906.
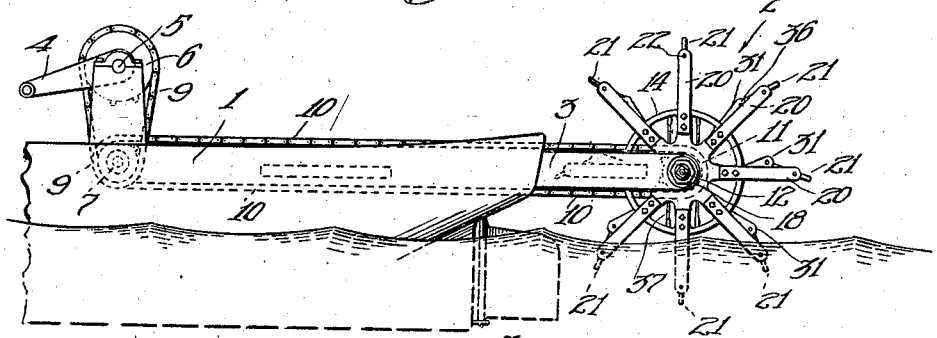
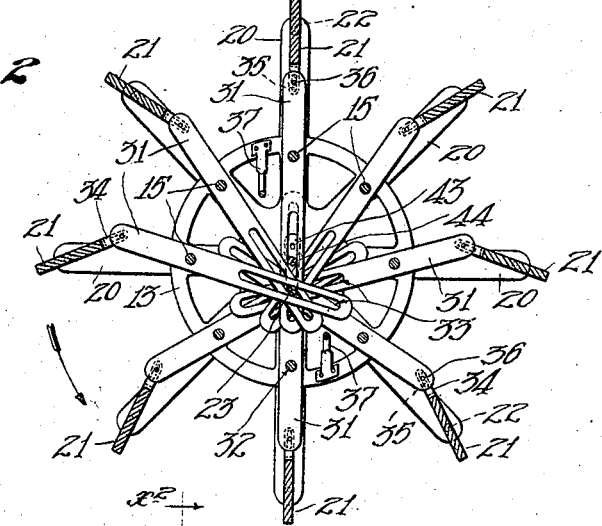
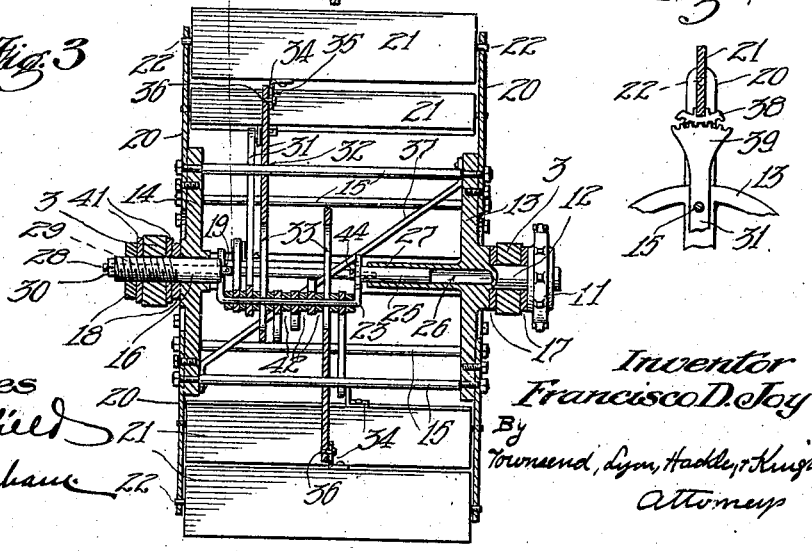

ized to be included in this document.

UNITED STATES PATENT OFFICE.

FRANCISCO D. JOY, OF GLENDORA, CALIFORNIA.

PADDLE-WHEEL FOR BOATS.

No. 847,481.            Specification of Letters Patent.            Patented March 19, 1907.

Application filed May 31, 1906. Serial No. 319,610.

*To all whom it may concern:*

Be it known that I, FRANCISCO D. JOY, a citizen of the United States, residing at Glendora, in the county of Los Angeles and State of California, have invented a new and useful Paddle-Wheel for Boats, of which the following is a specification.

This invention relates to paddle-wheels for propelling boats; and its main object is to provide a paddle-wheel wherein the blades will be automatically moved in the revolution of the wheel so as to strike and leave the water at the most efficient angle. In paddle-wheels wherein the blades are rigidly mounted the direct impact or motion of the blades on entering the water causes them to beat or strike the water, with the result that much power is lost, and a similar loss is involved in the lift of the water as the blades leave the same.

The present invention provides for tipping the blades as they enter and leave the water, so that they will be presented at angles enabling them to enter and leave the water with a minimum of resistance.

The accompanying drawings illustrate the invention.

Figure 1 is a side view of a boat provided with the paddle-wheel. Fig. 2 is a vertical section of the paddle-wheel on the line $x^2$ in Fig. 3. Fig. 3 is a vertical section of the paddle-wheel on the line $x^3$ in Fig. 2. Fig. 4 is a fragmentary elevation of a different form of blade-operating means.

The invention is particularly designed for use with other than sea-going boats and is here shown as so applied, 1 designating the boat, and 2 the paddle-wheel, which is mounted in bearings on arms 3, extending rearwardly from the boat, suitable driving means, such as a crank-handle 4, being mounted on bearings 5 on the boat and connected by sprockets 6 7 and sprocket-chains 9 10 to a sprocket-wheel 11 on the shaft 12 of the paddle-wheel. In case of large boats other driving means will be used.

The paddle-wheel comprises two disks or carrier members 13 14, connected by tie-bolts 15 to form a cage, the disk 13 being formed on or secured to the wheel-shaft 12 and the disk 14 being mounted to rotate on a journal 16, extending from one of the supporting-arms 3, the said journal being in line with the wheel-shaft 12. Washers 17 are provided on the shaft 12, and nuts 18 are provided on the screw-threaded arbor or journal 16, said nuts 18 engaging washers 41 on opposite faces of the arms 3 to hold the journal 16 in position.

A plurality of arms 20 extend radially from the respective disks 13 14, said arms being arranged in opposite pairs, and blades 21 extend between the pairs of arms and have pivot-pins 22 at their ends journaled in the said arms, the pivots of each blade being intermediate between the inner and outer ends of the blade.

A fixed controlling member 23 is provided within the wheel-cage extending parallel to and out of line with the axis of rotation of the wheel, said member consisting, for example, of a bar having its end portions at right angles to its middle portions and the said member being mounted by its end portions to be adjusted on an axis in line with the wheel-shaft 12. For this purpose one of said end portions may have a pin 25 extending into a bore 26 in a sleeve 27, extending axially from the shaft 12, and the other end of the member 23 is engaged by a clamp-eye 19 on a pin 28, extending through an axial bore 29 in the journal-arbor 16, said pin 28 having a nut 30 screwing on the outer end thereof to lock the member 23 in set position. This controlling member 23 is connected with the respective paddle-blades, for example, by means of levers 31, pivoted at 32 on the respective tie-bolts 15, the inner ends of said levers having longitudinal slots 33, which embrace and work on the controlling member 23, and the outer ends of said members being pivotally connected to arms 34 on the respective blades 21, the said arms having slots 35, slidably and pivotally engaged by pins 36 on the levers 31. The levers 31 are disposed in parallel planes or are spread apart in the longitudinal direction of the paddle-wheel by washers 42. Two brace-rods 37 extend diagonally across between the end disks 13 14 of the wheel-cage. Member 23 has a plurality of holes 43 to receive a screw 44, enabling radial adjustment of said member, said screw screwing into pin 25, the radial adjustment at the other end being effected by moving the member through the clamp-eye 19.

The operation is as follows: The rotation of wheel-shaft 12 by the driving means above described causes the disks 13 14 to turn continuously—for example, in the direction of the arrow in Fig. 2—the axis of rotation being somewhat above the water line or level, as indicated. The controlling member 23 may be assumed to be set in the same vertical plane as the axis of rotation of the wheel, so that as each paddle-blade reaches its uppermost position in the revolution of the wheel the levers 31 will extend in line with the pivot of the blade and with the member 23, so that the blade will be extended in a radial direction. As the blade revolves forward from this position the lever 31 will be acted upon by the engagement of the controlling member 23 therewith so as to turn relatively to the paddle-wheel, the upper end of the said lever 31 swinging backwardly, and thus tipping the paddle-blade forward. This forward movement continues and increases as the blade descends until the paddle passes below the axis of rotation of the paddle-wheel, being then somewhat diminished, but still retaining its dip, so that when the blade strikes the water it will enter the same in a nearly vertical direction, and the blade will at that time be presented in a nearly vertical plane, so that a minimum resistance will be encountered by the passage of the blade into the water. As the blade continues to descend its inclination to the radial direction is diminished, so that when the blade reaches its lowermost position it will again be presented in a radial direction and will present its full area in the backward action of the blade on the water. Then as the blade passes upwardly through the water it is tipped backwardly by the action of the levers 31, so that as it leaves the water it will be presented in a more nearly vertical plane and will free itself from the water with a minimum of resistance. It will be noted that as each blade strikes the water its inclination to the radial direction is being diminished by the action of the lever, and as the lower edge of the blade strikes the water first the reaction of the water against the blade tends to force the blade toward a radial direction, and therefore aids the action of the levers 31, so that no power is required to be exerted by the levers, but they act only as means for determining the angular direction of the blades. Similarly, as the blades are ascending and leaving the water the reaction of the water thereon tends to increase the inclination of the radial direction, and thus bring the blades naturally to positions required by the lever connections.

By loosening the nuts 44 and 30 and moving the controlling member 23 in one direction or the other the extent of shifting of the paddle-blades and the point at which the shifting takes place can be varied to produce the most effective operation according to special conditions.

In place of the pin-and-slot connection between the operating-levers 31 and the blade-arms 34 the blades 21 may be provided with segment-gears 38, as shown in Fig. 4, engaged by segment-gears 39 on the ends of the operating-levers indicated at 31 in Fig. 4.

The term "disk" herein used for the members 13 14 is intended to include any element of corresponding function, such as a hub, spider, or wheel member.

What I claim is—

1. A paddle-wheel for boats comprising a rotatable paddle-carrier, a series of paddles pivotally mounted in said carrier the pivots being intermediate the inner and outer ends of the blades, a fixed member extending parallel to and out of line with the axis of rotation of the carrier member, and levers pivoted on the carrier member and having an operating connection with the respective paddle-blades, said levers having a pivotal and sliding connection with said fixed member.

2. A paddle-wheel comprising two rotary members mounted to rotate on a horizontal axis, a series of paddle-blades pivotally mounted on said members the pivots being intermediate the inner and outer ends of the blades, a fixed member extending between said rotary members and out of line with the axis of rotation thereof, and a plurality of levers pivotally mounted on the rotary members and having operating connections with the respective paddle-blades, said levers having a pivotal and sliding connection with the said fixed member.

3. A paddle-wheel comprising two rotary members mounted to rotate on a horizontal axis, a series of paddle-blades pivotally mounted on said members the pivots being intermediate the inner and outer ends of the blades, a fixed member extending between said rotary members and out of line with the axis of rotation thereof, and a plurality of levers pivotally mounted on the rotary members and having operating connections with the respective paddle-blades, said levers having a pivotal and sliding connection with the said fixed member and extending in parallel vertical planes.

4. A paddle-wheel comprising two rotary members mounted to rotate on a horizontal axis, a series of paddle-blades pivotally mounted on said members the pivots being intermediate the inner and outer ends of the blades, a fixed member extending between said rotary members and out of line with the axis of rotation thereof, a plurality of levers pivotally mounted on the rotary members and having operating connections with the respective paddle-blades, said levers having a pivotal and sliding connection with the said fixed member and extending in parallel vertical planes, and means for adjusting the angular position of the controlling member.

5. The combination of two supporting-bearings and a paddle-wheel comprising a shaft member mounted to rotate in one of said bearings, and a disk carried by said shaft member, a journal member extending in line with the shaft member and fixed in the other of said bearings, a disk mounted to rotate on said journal member, tie-bolts secured to and extending between the said disks, arms extending from the said disks, paddle-blades pivoted in said arms, a controlling member extending parallel to and out of line with the axis of rotation of the paddle-wheel and provided with a supporting member extending through and secured to the said journal member, and levers pivotally mounted on the aforesaid tie-bolts and operatively connected to the respective paddle-blades, the inner ends of said levers being provided with slots which slide and turn on the aforesaid controlling member.

6. The combination of two supporting-bearings and a paddle-wheel comprising a shaft member mounted to rotate in one of said bearings, and a disk carried by said shaft member, a journal member extending in line with the shaft member and fixed in the other of said bearings, a disk mounted to rotate on said journal member, tie-bolts secured to and extending between the said disks, arms extending from the said disks, paddle-blades pivoted in said arms, a controlling member extending parallel to and out of line with the axis of rotation of the paddle-wheel and provided with a supporting member extending through and secured to the said journal member, and levers pivotally mounted on the aforesaid tie-bolts and operatively connected to the respective paddle-blades, the inner ends of said levers being provided with slots which slide and turn on the aforesaid controlling member, and means for adjustably holding said supporting member to adjust the angular position of the controlling member.

In testimony whereof I have hereunto set my hand, at Los Angeles, California, this 23d day of May, 1906.

FRANCISCO D. JOY.

In presence of—
   ARTHUR P. KNIGHT,
   BELL HALL.